(12) United States Patent
Cheung (10) Patent No.: US 6,565,243 B1
(45) Date of Patent: May 20, 2003

(54) LIGHTED WHEEL

(76) Inventor: James Cheung, 37-48 78th St., Jackson Heights, NY (US) 11372

( * ) Notice: Subject to any disclaimer, the term of this patent is extended or adjusted under 35 U.S.C. 154(b) by 0 days.

(21) Appl. No.: 10/105,844

(22) Filed: Mar. 25, 2002

(51) Int. Cl.⁷ .................................. B60Q 1/32
(52) U.S. Cl. ................. 362/500; 362/545; 362/800; 40/587
(58) Field of Search ................. 362/500, 545, 362/473, 800, 103, 486, 42, 806; 40/587

(56) References Cited

U.S. PATENT DOCUMENTS

| | | |
|---|---|---|
| 3,786,246 A | 1/1974 | Johnson et al. |
| 3,789,208 A | 1/1974 | Lewis |
| 4,176,390 A | 11/1979 | Galbert |
| 4,298,910 A | 11/1981 | Price |
| 4,363,502 A | 12/1982 | Bakerman |
| 4,383,244 A | 5/1983 | Knauff |
| 4,761,577 A | 8/1988 | Thomas et al. |
| 5,016,144 A | 5/1991 | DiMaggio |
| 5,278,732 A | 1/1994 | Frankum |
| 5,392,200 A | 2/1995 | Milde |
| 5,552,972 A * | 9/1996 | Rezvani ................. 362/500 |
| 5,839,814 A | 11/1998 | Roberts |
| 5,894,686 A | 4/1999 | Parker et al. |
| 5,951,150 A | 9/1999 | Helstern |
| 5,992,068 A | 11/1999 | de Saro |
| 6,158,156 A | 12/2000 | Patrick |
| 6,485,169 B1 * | 11/2002 | Ragner ................. 362/500 |

* cited by examiner

*Primary Examiner*—Sandra O'Shea
*Assistant Examiner*—Hargobind S. Sawhney
(74) *Attorney, Agent, or Firm*—Michael I. Kroll (57) ABSTRACT

The present invention 10 discloses lighted wheels using centrifugal force from a turning wheel 12 to close a magnetic switch 54, turning on a light source 26, 28 powered by batteries 56. The present invention consists of a control housing 18 which is placed inside the inner portion of a motorcycle rim 20 so that it may be acted upon by centrifugal force. The control housing 18 has a lighting control 62 with a plurality of magnetic switches 34 to activate selective lighting 26, 28 and batteries 56 to power the lighting and a processor 58 to give the lighting a blinking or oscillating effect. Within the housing are tension springs. 60 having varying lengths so that different amounts of centrifugal forces are needed to activate the switches. The tension springs 60 are attached to the center of the housing body with a magnetic switch 54 attached to the other end facing its corresponding attraction plate 66 so that when centrifugal forces act upon the magnet switch 54, the tension spring 60 will expand allowing the magnetic switch 54 to activate its corresponding lighting.

17 Claims, 13 Drawing Sheets

LIGHTED WHEEL

BACKGROUND OF THE INVENTION

1. Field of the Invention

The present invention relates generally to lighted wheels and more specifically to lighted wheels using centrifugal force from a turning wheel to close a photovoltaic switch, turning on a light source, powered by batteries. The present invention consists of a control housing which is placed inside the inner portion of a motorcycle rim so that it may be acted upon by centrifugal force. The control housing having a lighting control with a plurality of magnetic switches to activate selective lighting and batteries to power the lighting and a processor to give the lighting a blinking or oscillating effect. Within the housing are tension springs having varying lengths so that different amounts of centrifugal forces are needed to activate the switches corresponding light. The tension springs are attached to the center of the housing body with a magnetic switch attached to the other end facing its corresponding attraction plate so that when centrifugal forces act upon the magnet switch, the tension spring will expand allowing the magnetic switch to activate its corresponding lighting. The housing control also consists of attachment flanges to secure it to a vehicles rim. The control housing is electrically linked to a plurality of light housings that are attached to the side wall perimeter of the tire of a vehicle. The light housing consists of a primary and secondary set of lights each comprising of LED'S placed within the light fixture that is placed in there respective receptacle in the light housing.

2. Description of the Prior Art

There are lighted wheel devices designed to illuminate a vehicle's wheels. Typical of these is U.S. Pat. No. 3,786,246 issued to Johnson on Jan. 15, 1974.

Another patent was issued to Lewis on Jan. 29, 1974 as U.S. Pat. No. 3,789,208. Yet another U.S. Pat. No. 4,176,390 was issued to Galbert on Nov. 22, 1979 and still yet another was issued on Nov. 3, 1981 to Price et al. as U.S. Pat. No. 4,298,910.

Another patent was issued to Bakerman et al on Dec. 14, 1982 as U.S. Pat. No. 4,363,502. Another patent was issued to Knauff et al on May 10, 1983 as U.S. Pat. No. 4,383,244, Another patent was issued to Thomas et at on Aug. 2, 1988 as U.S. Pat. No. 4,761,577. Another patent was issued to DiMaggio et al on May 14, 1991 as U.S. Pat. No. 5,016,144. Another patent was issued to Frankum et al on Jan. 11, 1994 as U.S. Pat. No. 5,278,732.

Another patent was issued to Milde et al on Feb. 21, 1995 as U.S. Pat. No. 5,392,200. Another patent was issued to Roberts et al on Nov. 24, 1998 as U.S. Pat. No. 5,839,814. Another patent was issued to Chien et al on Mar. 2, 1999 as U.S. Pat. No. 5,876,108.

Another patent was issued to Parker et al. on Apr. 20, 1999 as U.S. Pat. No. 5,894,686. Another patent was issued to Helstern on Sep. 14, 1999 as U.S. Pat. No 5,951,150. Another patent was issued to de Saro on Nov. 30, 1999 as U.S. Pat. No. 5,992,068 and another patent was issued to Patrick on Dec. 12, 2000 as U.S. Pat. No. 6,158,156.

U.S. Pat. No. 3,786,246

Inventor: Stephen C. Johnson

Issued: Jan. 15, 1974

A Frisbee-type flying saucer toy which has a generally disc-shaped body terminating at its periphery in a downwardly pointing rim so that the body and the rim define a generally convex upper surface and generally concave lower surface. Lighting means, preferably in the form of a plurality of regular spaced lamps, is generally fixedly disposed proximate the rim so as to be visible when energized from the outside of the rim. A battery holder is generally centrally located on the body, preferably on the outside thereof and electrical conductors extend generally radially outwardly alone the body from the battery holder to the lights. The battery holder, lights, and electrical conductor means are all embodied in a unitary structure having a central hub in which the battery holder is located, with a plurality of regular spaced arms extending radially outwardly from the hub, with the lights located at the ends of the arms, and the electrical conductor extending along the arms.

U.S. Pat. No. 3,789,208

Inventor: Elwood Lewis

Issued: Jan. 29, 1974

A roller skate wheel attachment which is removably attached to a wheel at the axle thereof. The device includes a connector which removable affixes to the wheel axle and a rotary member which is rotatable about the connector and which rotates when the wheel rotates.

U.S. Pat. No. 4,176,390

Inventor: David Galbert

Issued: Nov. 27, 1979

An improved light adapted to be connected to a wheel of, e.g., a bicycle. In preferred form, the light is fixed to the wheel in a manner that orients the light's battery on an axis positioned substantially radially of the wheel, and that orients the light's battery radially inward of the light's bulb relative to the wheel's axis. A switch spring is provided in the light's housing that normally biases the battery out of electrical contact with the bulb when the wheel is not rotating, i.e., when the bicycle is not in use, but which permits the battery to be biased into electrical contact with the bulb in response to centrifugal force when the wheel is rotating, i.e., when the bicycle is in use. Thus, the light turns off automatically when the bicycle is not being ridden, and turns on automatically in response to centrifugal force when the bicycle is being ridden, when the light is mounted on a bicycle's wheel.

U.S. Pat. No. 4,298,910

Inventor: Robert Price

Issued: Nov. 3, 1981

A roller skate wheel has an inner body portion for securement to the axle of the roller skate and an outer body rotatable about the inner body on appropriate bearings. A permanent magnet is secured to the inner body in flux coupling relationship with electrically conducting windings carried on the outer body. When the wheel rotates, electricity is generated on the windings and used to energize light emitting diodes carried on the outer body of the wheels. The generated electricity is of the alternating type and since the light emitting diodes are essentially polarity-sensitive, they will be energized on only positive half cycles of the current to thereby provide a flashing or stroboscopic effect.

U.S. Patent Number 4,363,502

Inventor: David Bakerman

Issued: Dec. 14, 1982

A skate has a wheel rotatably mounted on an axle with a light emitting element mounted on the wheel for making the wheel illuminative when an electrical potential is applied to the light emitting element. The electrical potential can be supplied by a battery installed within the wheel through a switch which can be actuated by rotating a cap movably mounted on the hub of the wheel or contacts actuated by centrifugal force upon rotation of the wheel. The rotor and starter of an electrical generator can be mounted on the axle and wheel to generate the electrical potential in an embodiment which does not require a battery.

U.S. Pat. No. 4,383,244

Inventor: Robert Knauff

Issued: May 10, 1983

Intensified light emitting diodes intermittently energized while in motion, the light emission thereof being sensed by eyesight retention as dots and bars of light dynamically related and intermixed relative one to the other in an infinite number of geometric patterns dependent upon the simple and compound application of rectilinear, arcuate and rotary motion in combination with the frequency, spacing and duration of pulse application by a flasher circuit modified by adjustment both manually and automatically.

U.S. Pat. No. 4,761,577

Inventor: Stephen Thomas

Issued: Aug. 2, 1988

A wheel mounted hub containing an electrical generator which is pivotally supported in arms of a yoke. The yoke and generator have an offset center of gravity, tending to give the yoke and generator a pendulum-like behavior within the housing. During wheel rotation, the generator tends to remain along a gravitational line of force, forcing a small wheel associated with the generator to turn against the hub. Around the outer periphery of the yoke, yet within the hub housing, is a circuit board which carries a power utilization circuit, so that the electrical path between the generator and the utilization circuit is very short. The circuit board may carry auxiliary circuits such as a current limiter, a generator disengaging circuit, a daylight deactivating circuit and a circuit for allowing operation regardless of direction of rotation.

U.S. Pat. No. 5,016,144

Inventor: Darryl DiMaggio

Issued: May 14, 1991

A unique and improved illuminating vehicle wheel cover using advanced electronics to illuminate light emitting diodes, aesthetically arranged, to create an illusionary effect. The present invention includes a unique momentary rotating mercury switch which gathers mercury during rotation and causes a momentary electrical connection.

U.S. Pat. No. 5,278,732

Inventor: John Frankum

Issued: Jan. 11, 1994

A portable light and reflector for use on the spoke of a bicycle wheel or on other similar vehicles uses a centrifugal switch to complete an electrical circuit between a light source and power source. The centrifuigal switch responds to the centrifugal force occurring from the rotation of the wheel. The centrifugal switch, power source and lighting circuitry are mounted within a watertight chamber of the light and reflector housing. The housing contains both translucent and reflective surfaces to take advantage to light incident upon the reflector from outside sources as well as transmitting light and reflecting light from the light source provided. The portable light and reflector disclosed use an LED and lithium battery and is has an easy method for assembling and attaching the housing to the spoke of the bicycle wheel.

U.S. Pat. No. 5,392,200

Inventor: Marcus Milde

Issued: Feb. 21, 1995

A circuit for providing illumination on a wheel hub cap comprises a plurality of electric lights, adapted to be arranged on the hub cap; an electric battery, adapted to be arranged on the hub cap; and at least one inertial switch connected electrically in series between the battery and the electric lights and adapted to be arranged on the hub cap in spaced relationship to the central axis of the hub cap and with such orientation as to be closed by centrifugal force upon rotation of the hub cap.

U.S. Pat. No. 5,839,814

Inventor: Thomas Roberts

Issued: Jan. 11, 1994

A miniaturized lighting apparatus for a rotating object includes a light-emitting diode (LED), a centrifugal switch, a tiny 3-volt power source, and electrical conduits. The switch is configured to provide power to the LED only upon application of a specific centrifugal force. As applied to an in-line roller skate wheel, the switch and LED may be sealed within the wheel, and the batteries never need replacement because the battery life exceeds the expected wheel life. An in-line skate wheel incorporating the lighting apparatus within it is activated to light the wheel at a predetermined centrifugal force equivalent to a given rotational speed of the wheel, such as 80 rpm. As applied to a reflector light for a bicycle wheel, the light draws power from the battery(ies) only while the wheel is turning at a minimum predetermined rotational speed such as 20 rpm. As applied to a rotatable flying disc, lighting apparatus are mounted on opposite sides of the disc, near the disc periphery. The switch is constructed to actuate the LED at a low rotational speed, and the disc itself is constructed of a phosphorescent material with persistent afterglow. Alternatively, a time delay may be incorporated into the lighting circuit to provide a delayed shut-off of current to the LED.

U.S. Pat. No. 5,876,108

Inventor: Tseng Lu Chien

Issued: Mar. 2, 1999

A rotating object such as a wheel, wheel cover, or hubcap includes a lighting arrangement in the form of a super-thin lighting element such as an electro-luminescent or photo-luminescent strip or panel. In the case of an electro-luminescent strip or panel, the power supply is positioned on the rotating object so as not to interfere with rotation of the object, and may include a specially designed spring-based motion sensitive switch which can be deactivated by inserting a straw-like member between the poles of the switch.

U.S. Pat. No. 5,894,686

Inventor: Jeffery R. Parker

Issued: Apr. 20, 1999

Light distribution systems include a light-emitting portion, a light source for supplying light to the light emitting portion and a power source for the light source. A sealed holder or pocket may be provided for the light-emitting portion. The light emitting portion may be located on an upper portion of a shoe and include a raised or relieved area from which light is emitted. The light distribution systems may include an additional light source which is directional so it can be seen at a greater distance than the light emitting portion. An information display system may also be provided, including a liquid crystal display located on an upper portion of a shoe, and a motion sensor for controlling operation of the display.

U.S. Pat. No. 5,951,150

Inventor: Robert Patrick Helstern

Issued: Sep. 14, 1999

A display system includes a plurality of color filters disposed between a plurality of light sources and a display panel. A first light source is energizeable to transmit light through a first color filter to illuminate the display panel with a first color (red). A second light source is energizeable to transmit light through a second color filter to illuminate the display panel with a second color (green). The first and second light sources are simultaneously energizeable to transmit light through both of the color filters to illuminate the display panel with a third color (yellow). The display panel includes inner and outer layers containing light absorbing pigment and light scattering particulate. The outer layer of the panel contains a greater quantity of pigment than the inner layer. The inner layer of the panel contains a greater quantity of light scattering particulate than the outer layer. The inner and outer layers of the panel have the same optical density.

U.S. Pat. No. 5,992,068

Inventor: Javier Alejandro Garcia de Saro

Issued: Nov. 30, 1999

A sign has multiple light translucent layers that are adjacent one another with such translucent layers being broken to form in one or more areas indicia (i.e. letters, numbers, etc.) meant to be visualized by an observer. These areas include a mid-layer, which is preferably colored and may be florescent, and a forefront layer. A large transparent void area is located between the mid-layer and the forefront layer, the forefront layer being closest to the observer. The forefront layer has a base color layer, which may be slightly reflective, and an outer color layer which is closest to the viewer. The base color layer and the outer color layer, like the mid-layer, are in the shape of letters and indicia to be communicated. At least one milky white background layer forms the back of the sign. Other milky white layers having breaks in their integrity may be located adjacent to the rear most milky white layer and resulting in a soft background design.

U.S. Pat. No. 5,158,156

Inventor: David Patrick

Issued: Dec. 12, 2000

The invention relates to display panels suitable for use in providing information or other data for viewing in differing light conditions and/or for purely decorative purposes. Examples of panels according to the invention comprise a substrate (2) which may be rendered smoky in appearance by the use of a coating (6) of a smoky dye or by inclusion of a dye in the plastics or glass from which the substrate is formed. On the obverse side of the panel, there is provided a first layer (8) of transparent or partially transparent material in which is carried fragments of translucent material such as mica having enhanced color iridescence by being coated with a suitable metal oxide. The layer (8) may be continuous or discontinuous. On the reverse side of the panel is provided a layer (12) including pigmented material for example in the form of graphics or other patterning to be displayed as a result of being backlit by a source of light (14) sufficiently strong to suppress the iridescence of the layer (8) visible in ambient lighting so that what was visible on the obverse face effectively disappears and the graphics of the layer (12) become visible to the observer.

SUMMARY OF THE PRESENT INVENTION

The present invention discloses lighted wheels using centrifugal force from a turning wheel to close a magnetic switch, turning on a light source powered by batteries. The present invention consists of a control housing which is placed inside the inner portion of a motorcycle rim so that it may be acted upon by centrifugal force. The control housing has a lighting control with a plurality of magnetic switches to activate selective lighting and batteries to power the lighting and a processor to give the lighting a blinking or oscillating effect. Within the housing are tension springs having varying lengths so that different amounts of centrifugal forces are needed to activate the switches. The tension springs are attached to the center of the housing body with a magnetic switch attached to the other end facing its corresponding attraction plate so that when centrifugal forces act upon the magnet switch, the tension spring will expand allowing the magnetic switch to activate its corresponding lighting. The control housing is electrically linked to a plurality of light housings that are attached to the side wall perimeter of the tire of a vehicle. The light housing consists of a primary and a secondary set of lights each comprising multiple LED's placed within the light fixture that is placed in their respective receptacle in the light housing.

A primary object of the present invention is to provide a decorative lighting system to apply to the wheels of a motorcycle or vehicle.

Another object of the present invention is to provide a decorative lighting system with an on/off switch that is activated by centrifugal force.

Yet another object of the present invention is to provide a decorative lighting system to apply to the wheels of a motorcycle or vehicle consisting of a plurality of lights that would line the side wall perimeter of a tire.

Still yet another object of the present invention is to provide a decorative lighting system consisting of a control housing and a plurality of light housings where the control housing is placed inside the inner portion of a rim of a vehicle so that it may be acted upon by centrifugal forces.

Yet another object of the present invention is to provide a decorative light system having wires that carry current from the control housing to the primary and secondary lighting. Also to provide a decorative lighting system with an on/off switch that is activated by centrifugal force. Also to provide a decorative lighting system to apply to the wheels of a motorcycle or vehicle consisting of a plurality of lights that would line the side wall perimeter of a tire.

Additional objects of the present invention will appear as the description proceeds.

The present invention overcomes the shortcomings of the prior art by providing a decorative light system having a plurality of tension springs attached to the center of the housing body with a magnet switch attached to the other end facing its corresponding attraction plate so that when centrifugal forces act upon the magnet switch, the tension springs will expand allowing the magnet switch to activate its corresponding light.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claim.

LIST OF REFERENCE NUMERALS

With regard to reference numerals used, the following numbering is used throughout the drawings.

10 present invention
12 tire
14 motorcycle
16 lights
18 control housing
20 rim
22 light housing
24 wire
26 primary light
28 secondary light
30 photovoltaic switch
32 adhesive
34 adhesive backing
36 primary light cover
38 secondary light cover
40 LED
42 primary light fixture
44 secondary light fixture
46 primary light receptacle
48 secondary light receptacle
50 rim receiving area
52 wiring outlets
54 magnetic switch
56 battery
58 processor
60 tension springs
62 lighting control
64 movement due to centrifugal force
66 attraction plate
68 hubcap
70 housing member
72 side
74 attachment flange
76 sound generator
78 air inlet
80 air inlet
82 housing body

DETAILED DESCRIPTION OF THE PREFERRED EMBODIMENTS

The following discussion describes in detail one embodiment of the invention and several variations of that embodiment. This discussion should not be construed, however, as limiting the invention to those particular embodiments. Practitioners skilled in the art will recognize numerous other embodiments as well. For a definition of the complete scope of the invention, the reader is directed to the appended claims.

Figure 1:
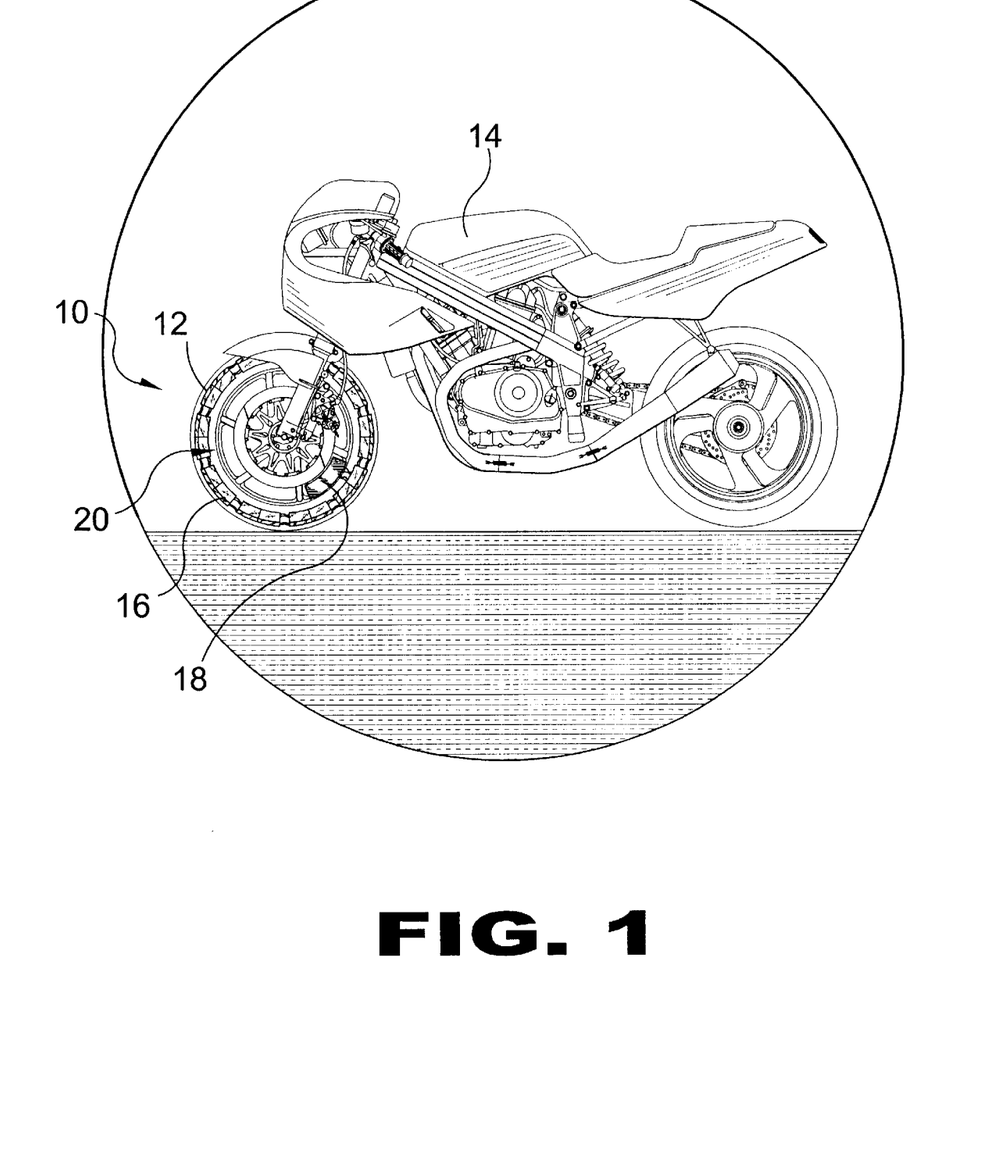
FIG. 1 is a perspective view of the present invention.

Turning to FIG. 1, shown therein is a perspective view of the present invention 10, showing the device installed on the front tire 12 of a motorcycle 14 with a plurality of lights 16 spaced about and lining the side wall perimeter of the tire 12. Also shown is the control housing 18 placed inside the inner portion of the motorcycle rim 20 so that it may be acted upon by centrifugal force.

Figure 2:
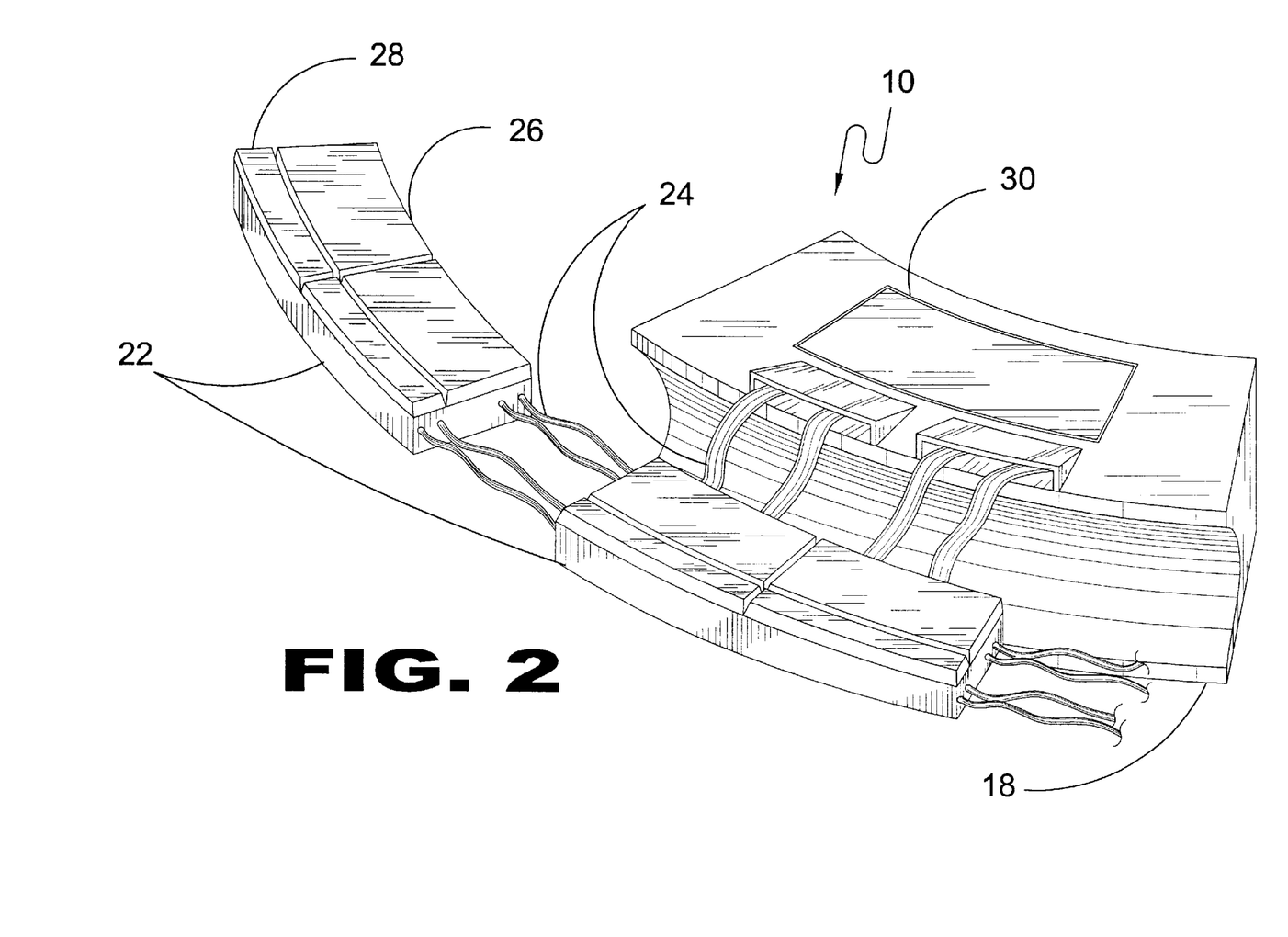
FIG. 2 is a perspective view of the present invention.

Turning to FIG. 2, shown therein is a perspective view of the present invention 10 showing the device having a plurality of light housings 22 and a control housing 18 having an inner and an outer side. Also shown are wires 24 that carry current from the control housing 18 to the primary 26 and secondary 28 lighting. Also shown is a photovoltaic switch 30 disposed on the control housing 18.

Figure 3:
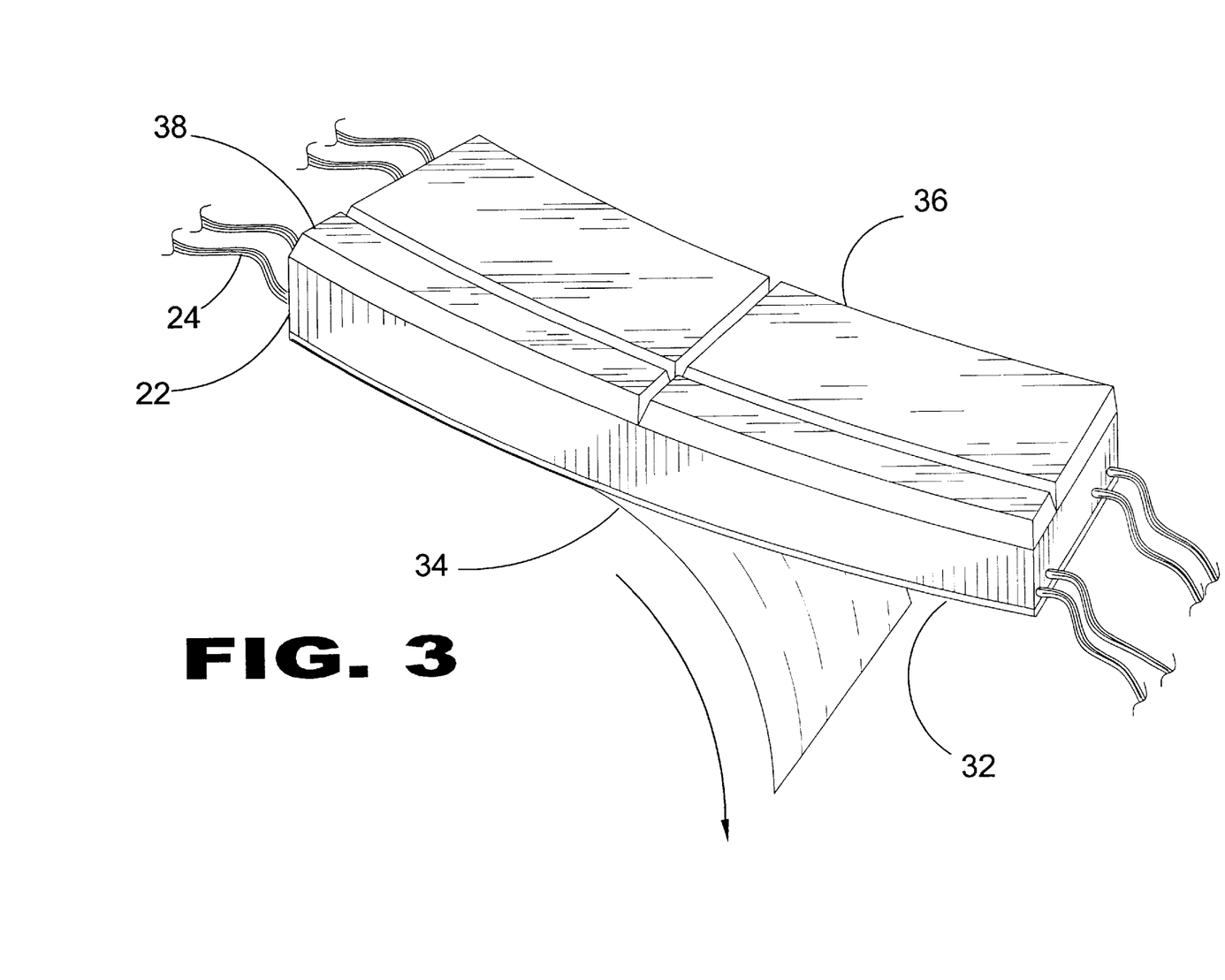
FIG. 3 is a perspective view of the present invention.

Turning to FIG. 3, shown therein is a perspective view of the present invention showing the device being complementarily shaped as a tire having adhesive 32 to connect the light housing 22 to the side wall of the tire. Also shown is a peel away adhesive backing 34 on the bottom of the housing to proiect the adhesive 32 until installation. Also shown are the primary lighting cover 36 and secondary lighting cover 38.

Figure 4:
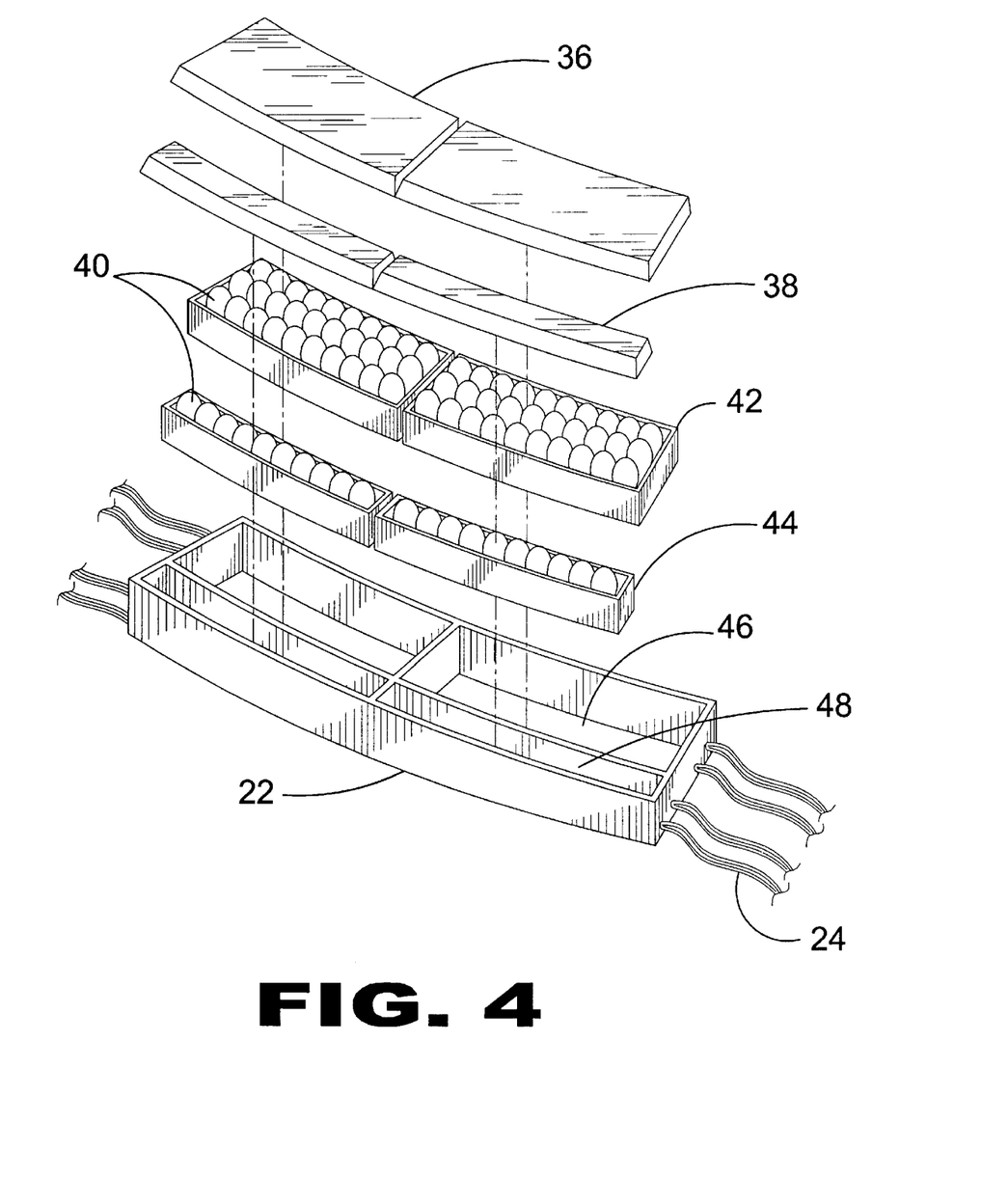
FIG. 4 is an exploded view of the present invention.

Turning to FIG. 4, shown therein is an exploded view of the present invention showing the internal components of the elongated arcuate light housing 22 with the light housing having both a primary and secondary set of lights with covers 36, 38 each comprised of multiple LED's (light emitting diodes) 40 placed inside a primary 42 and secondary 44 light fixture that is then placed within their respective receptacles 46, 48 in the light housing along with wiring 24.

Figure 5:
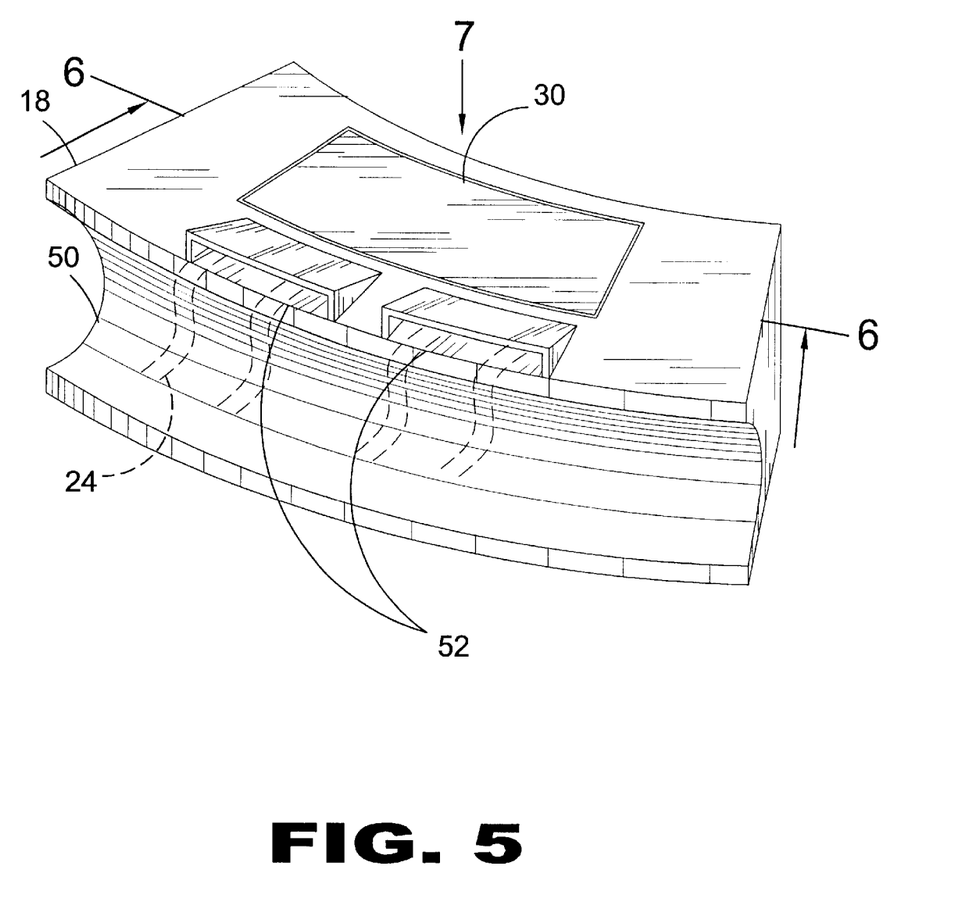
FIG. 5 is a perspective view of the present invention.

Turning to FIG. 5, shown therein is a perspective view of the present invention showing the device having a photovoltaic switch 30 to turn the device off during the day and a rim receiving area 50 being a recess on its outer side to attach the control housing 18 to the inside portion of the rim of a motorcycle. Also shown are wiring outlets 52 through which wires 24 pass.

Figure 6:
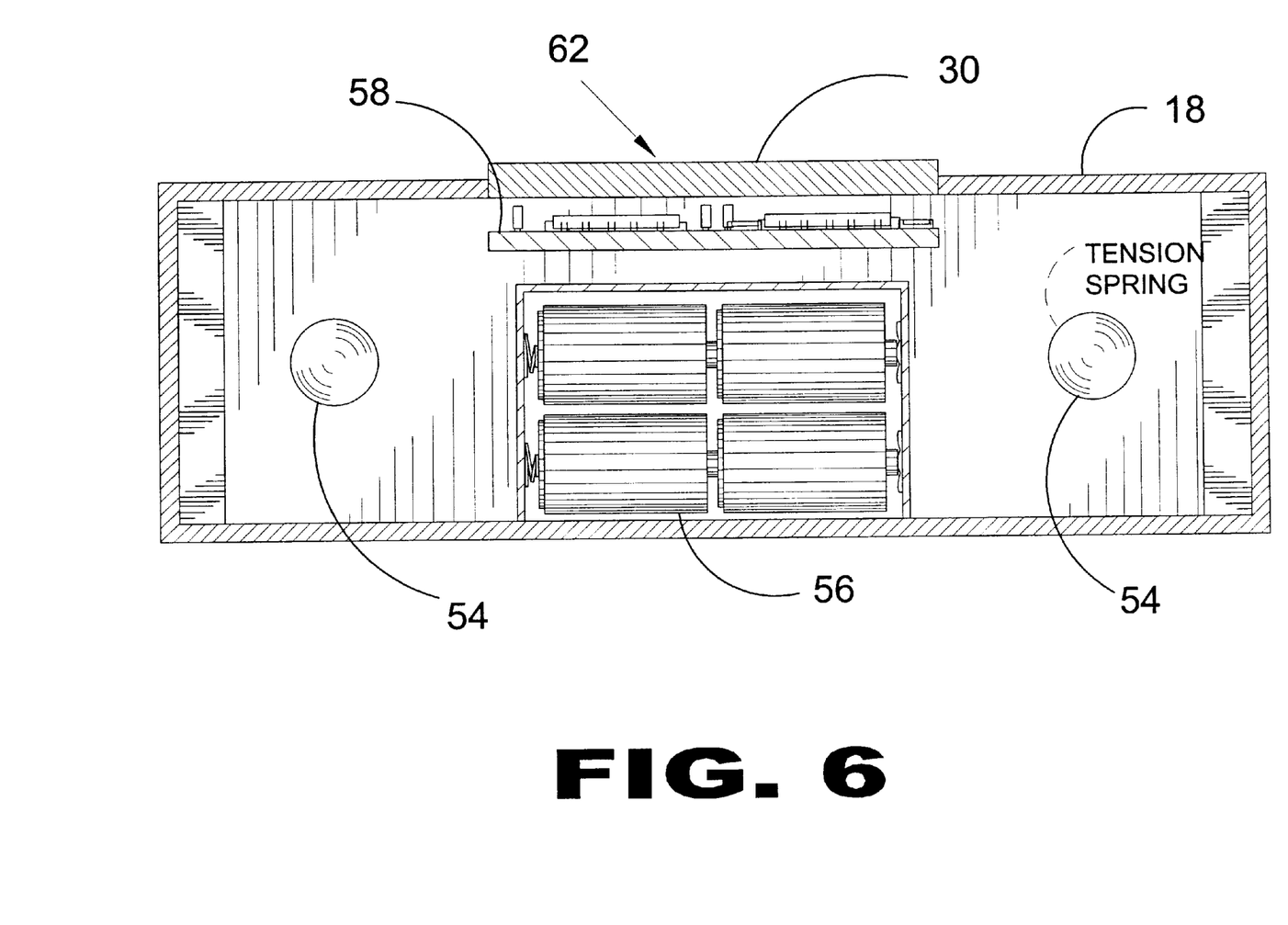
FIG. 6 is a cross sectional view of the present invention.

Turning to FIG. 6, shown therein is a cross sectional view of the present invention 10 showing the control housing 18 of the device having a plurality of magnetic switches 54 with tension springs 60 to activate selective lighting with multiple batteries 56 to power the lighting and a processor 58 to give the lighting a blinking or oscillating effect. Also shown is a lighting control 62 with photovoltaic switch 30.

Figure 7:
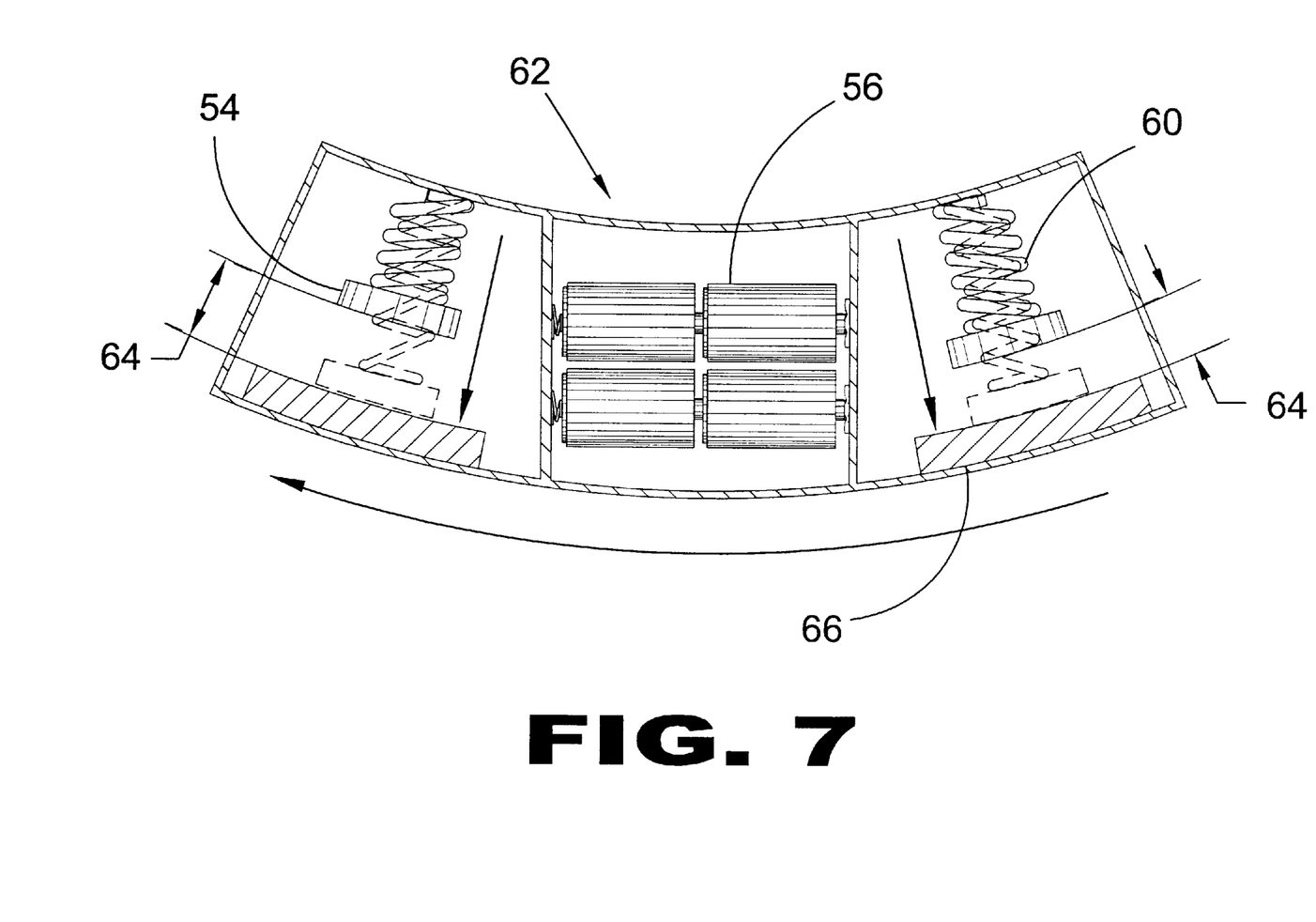
FIG. 7 is a cut away view of the present invention.

Turning to FIG. 7, shown therein is a cut away view of the present invention showing the device with a lighting control 62 for a motorcycle. Also shown are the tension springs 60 having varying lengths so that the movement induced at point 64 by different amounts of centrifuigal forces are needed to activate the magnetic switches 54 by movement toward attraction plate 66 thereby activating the corresponding lighting. Also shown are the batteries 56.

Figure 8:
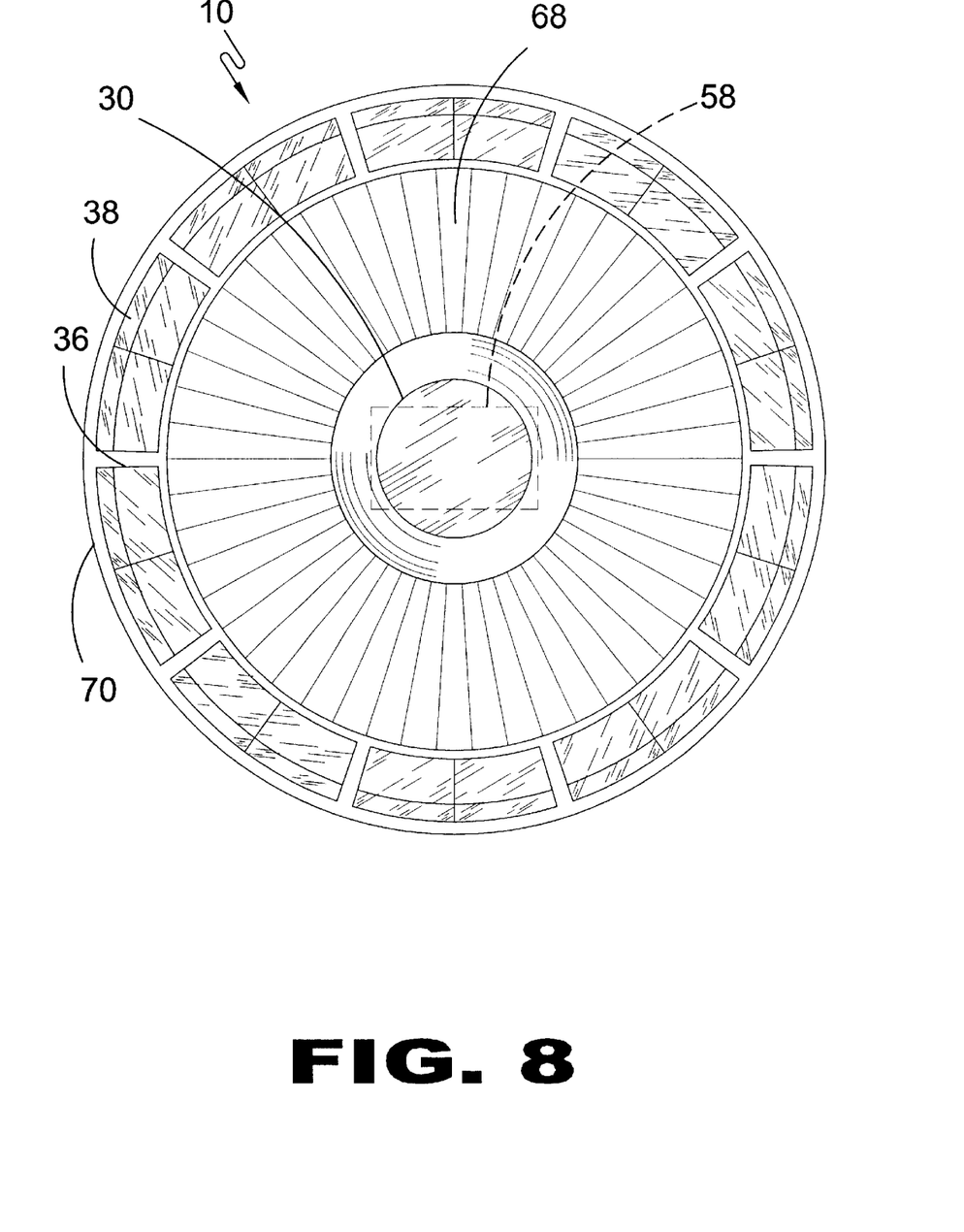
FIG. 8 is a top view of the present invention.

Turning to FIG. 8, shown therein is a top view of the present invention 10 installed within a hubcap 68 forming an integral part therewith. The hubcap 68 provides a housing member 70 and protection for all components of the present invention such as the wires. Other elements that are previously disclosed are also shown.

Figure 9:
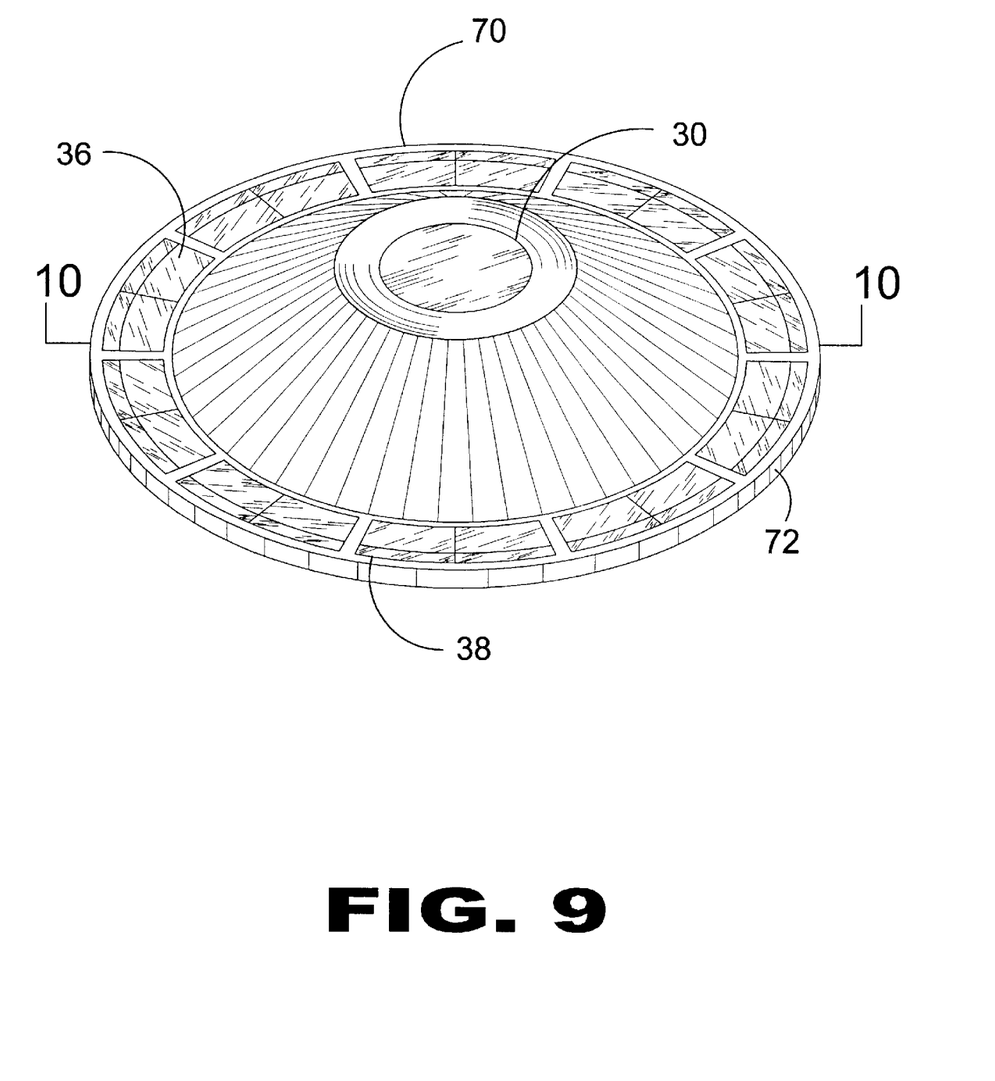
FIG. 9 is an isometric view of the present invention.

Turning to FIG. 9, shown therein is an isometric view of the present invention showing the device in a form similar to a hubcap with an enlarged peripheral edge 72 that extends past the sides of a rim so that lighting in that area may be achieved along with easy installation to a car's tire. Other elements that are previously disclosed are also shown.

Figure 10:
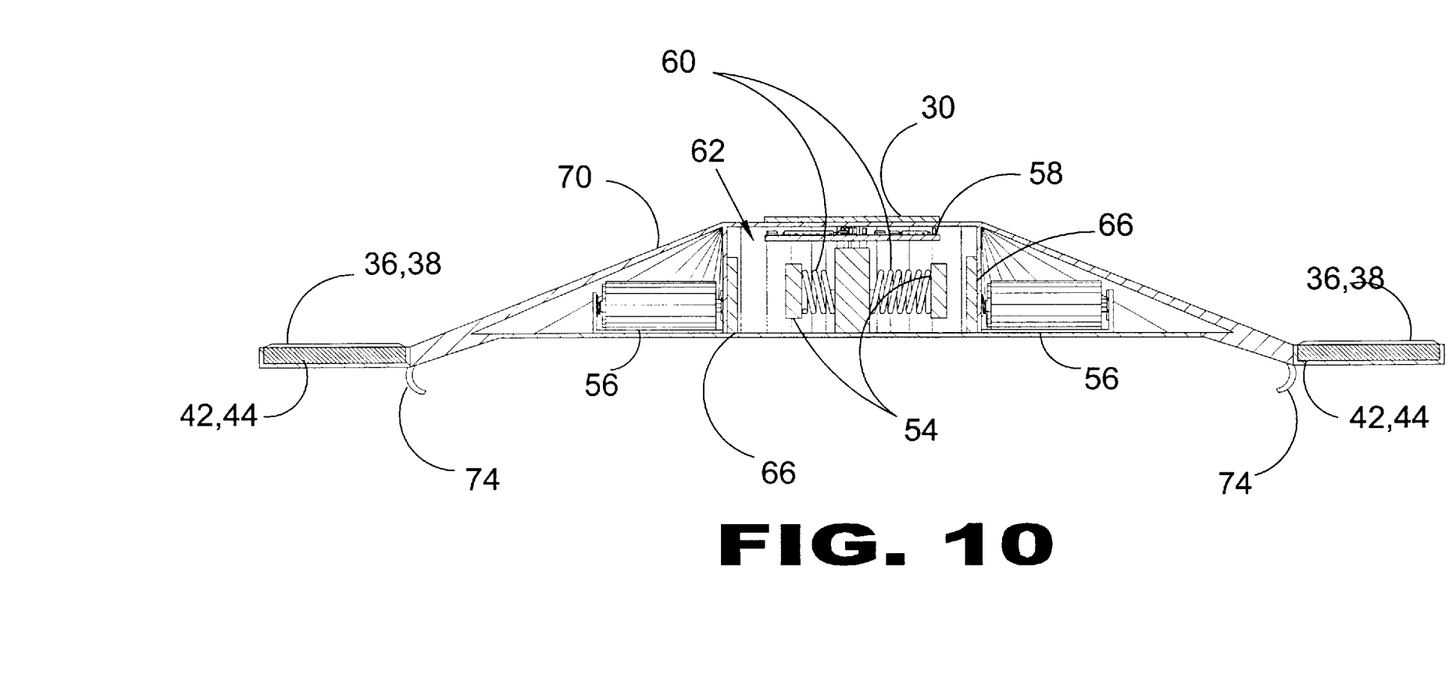
FIG. 10 is a cross sectional view of the present invention.

Turning to FIG. 10, shown therein is a cross sectional view of the present invention showing the device having a plurality of tension springs 60 attached to the center of the housing body 70 with a magnetic switch 54 attached to the other end facing its corresponding attraction plate 66 so that when centrifugal forces act upon the magnetic switch 54, the tension springs 60 will expand, allowing the magnetic switch 54 to activate its corresponding lighting. Also shown are a plurality of attachment flanges 74 to secure the present invention to a vehicles rim. Other elements previously disclosed are also shown.

Figure 11:
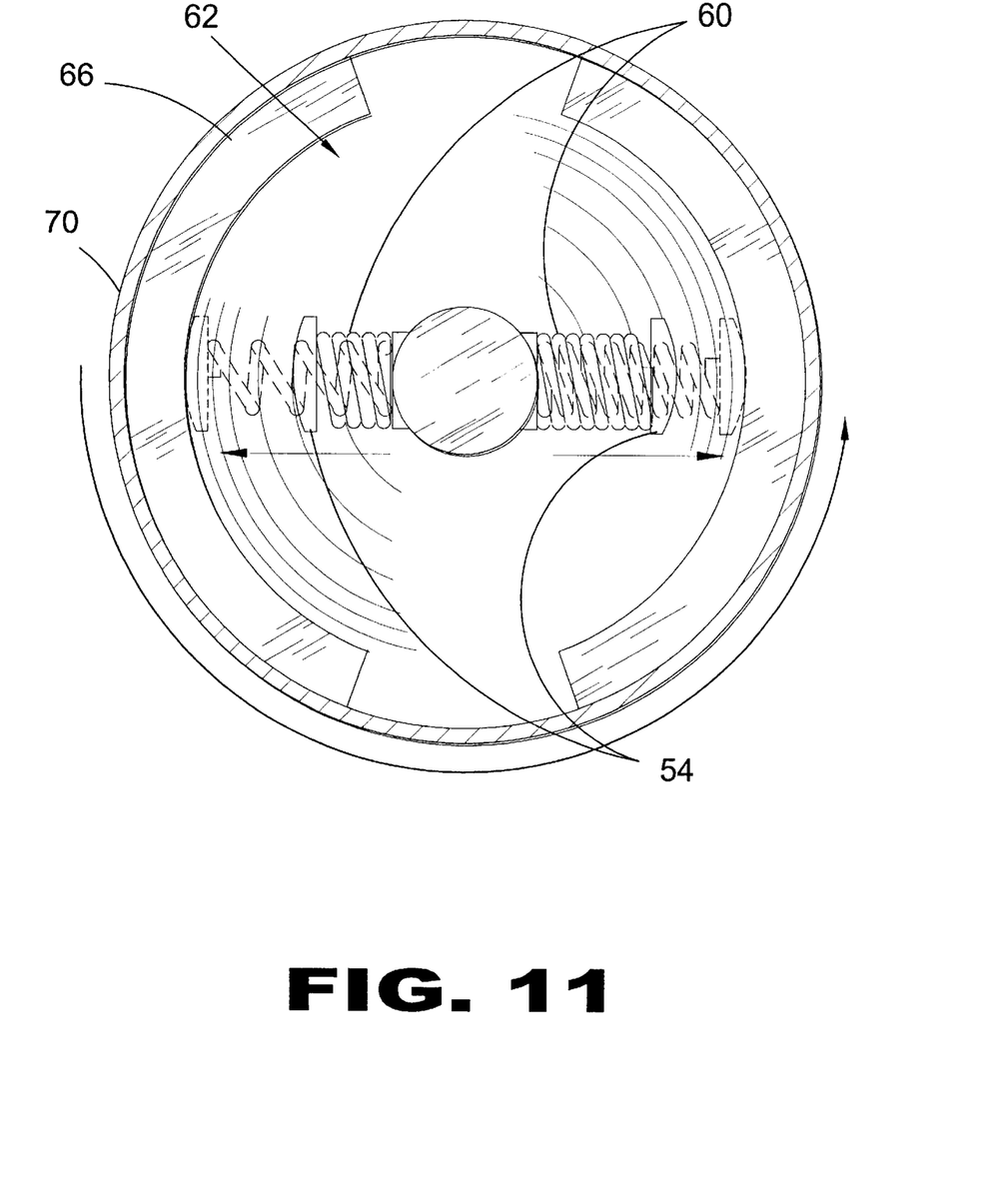
FIG. 11 is a cut away view of the present invention.

Turning to FIG. 11, shown therein is a cut away view of the present invention showing the device with a circular lighting control 62 used in the car based version. Also shown is the housing member 70 rotating to exert centrifugal forces upon the magnetic switches 54 causing the tension springs 60 to expand at certain speeds allowing the magnetic switch to attract to and make contact with the attraction plate 66 resulting in a complete circuit that will activate the set of lighting to which the respective switch corresponds.

Figure 12:
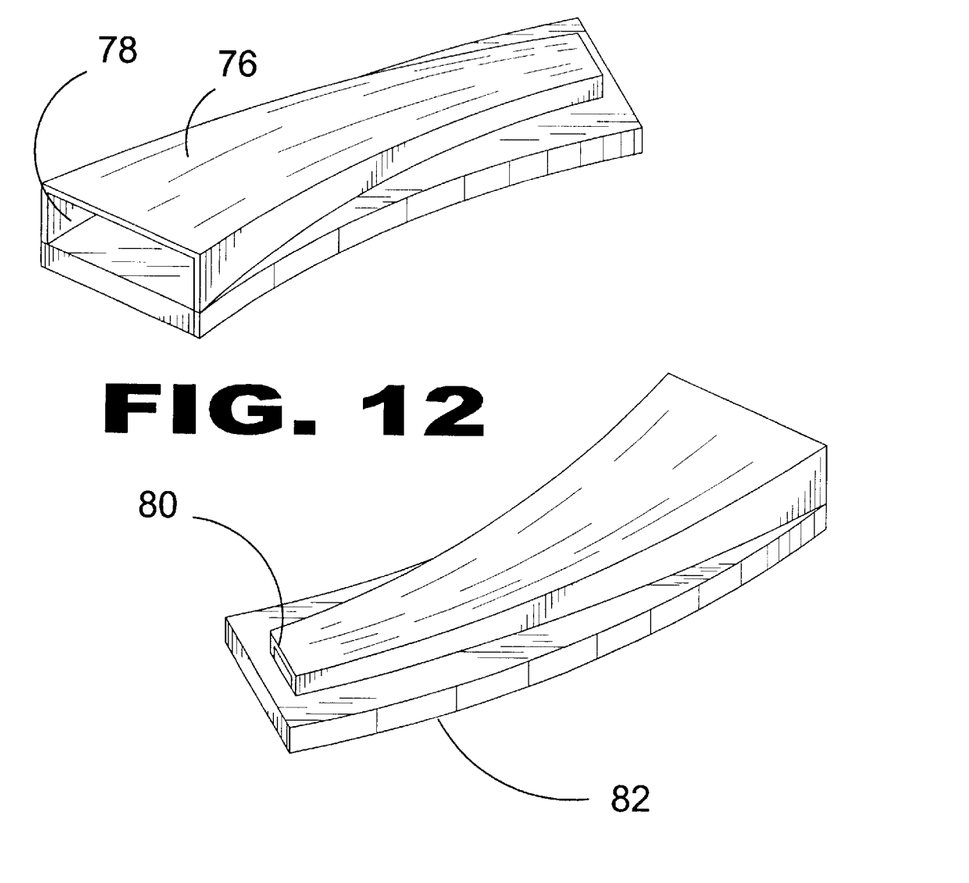
FIG. 12 is an additional element of the present invention.

Turning to FIG. 12, shown therein is an additional element of the present invention showing the device with sound generating elements 76 with air inlet 78 and a constricted air outlet 80 that may be used in addition to or replacing a lighting fixture. The second generator 76 attaches to the surface of the housing body 82 of the light fixture.

Figure 13:
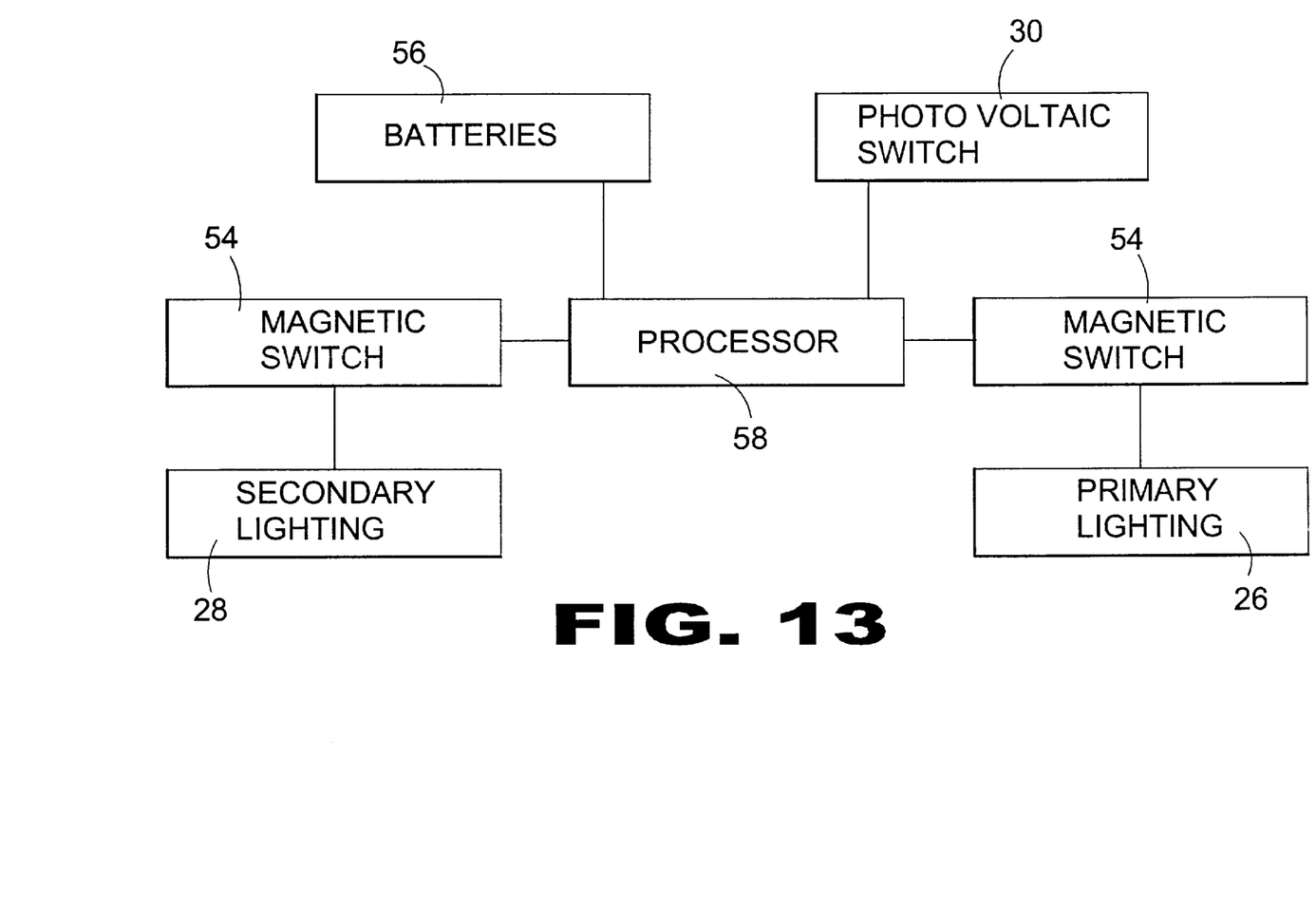
FIG. 13 is a block diagram of the present invention.

Turning to FIG. 13, shown therein is a block diagram of the function of the present invention.

What is claimed to be new and desired to be protected by Letters Patent is set forth in the appended claims.

I claim:

1. An apparatus for providing lights on the wheel of a vehicle, the wheel having a rim and a tire thereon, comprising:
   a) a plurality of light housings disposed on the sidewall of the tire for receiving lights therein, said housings being spaced about the tire, said housings having a top side and a bottom side;
   b) means for lights disposed in said light housings whereby a plurality of lights are provided on the tires;
   c) a control housing disposed on the inner portion of the rim for receiving controls therein, said housing having an inner and outer side; and,
   d) means for a light control disposed in said control housing whereby a plurality of lights are controlled.

2. The apparatus of claim 1, wherein said light housings are elongated and arcuate, said arcuate being complimentary shaped as the tire to permit attachment to the tire.

3. The apparatus of claim 2, further comprising an adhesive surface on said bottom of said light housings to permit attachment of said light housings to the sidewall of the tire, and a peel-off backing disposed on said adhesive surface to protect said adhesive surface until use.

4. The apparatus of claim 3, wherein said means for lights comprises a plurality of light emitting diodes disposed in said light housing.

5. The apparatus of claim 4, wherein said means for lights comprises:
   a) a primary light fixture and a secondary light fixture for receiving said light emitting diodes;
   b) a primary receptacle for receiving said primary light fixture therein and a secondary receptacle for receiving said secondary light fixture therein; and,
   c) a primary light cover disposed on said primary light fixture and a secondary light cover disposed on said secondary light fixture.

6. The apparatus of claim 5, wherein said control housing is complimentarily shaped as the rim of the vehicle, wherein said outer side has a recess therein, said recess for receiving the inner portion of the rim of a wheel therein to permit attachment of the control housing to the wheel.

7. The apparatus of claim 6, wherein said means for a light control comprises:
   a) a photovoltaic switch to turn said plurality of lights off during the daylight;
   b) means for a magnetic switch to control said plurality of lights whereby said lights respond to changing centrifugal force upon said means for a magnetic switch;
   c) a power supply; and,
   d) electrical wiring for connecting the components to each other.

8. The apparatus of claim 7, wherein said power supply comprises a battery.

9. The apparatus of claim 8, wherein said means for a magnetic switch further comprises an attraction plate to which said magnetic switch is attracted and a tension spring for biasing said magnetic switch away from said attraction plate.

10. The apparatus of claim 9, wherein said control housing has at least one wire outlet therein, said outlet for passage therethrough of said electrical wiring.

11. The apparatus of claim 10, further comprising a hubcap being disposed on the wheel of the vehicle, wherein said plurality of light housings, said means for lights, said control housing and said means for a light control are disposed on said hubcap, said hubcap further comprising an enlarged peripheral edge extending beyond the inner edge of the rim.

12. The apparatus of claim 11, wherein said primary and said secondary light fixtures are disposed on said enlarged peripheral edge of said hubcap.

13. The apparatus of claim 12, wherein said control housing and said means for a light control are disposed centrally internal of said hubcap.

14. The apparatus of claim 13, wherein said hubcap further comprises a plurality of attachment flanges disposed on the inner face of said hubcap to permit attachment of said hubcap to the wheel of the vehicle.

15. The apparatus of claim 14, wherein said means for a light control is circularly shaped to permit installation on a vehicle.

16. The apparatus of claim 15, further comprising means for generating sound disposed on an outer surface of said primary and secondary light fixture.

17. The apparatus of claim 16, wherein said means for generating sound comprises a first larger air inlet and a second smaller air outlet to permit sound generation.

* * * * *